United States Patent [19]

Malik

[11] Patent Number: 4,782,851

[45] Date of Patent: Nov. 8, 1988

[54] CAPILLARY VALVE FOR HYDRAULIC SYSTEMS

[75] Inventor: Marvin J. Malik, Bloomfield Hills, Mich.

[73] Assignee: General Motors Corporation, Detroit, Mich.

[21] Appl. No.: 83,320

[22] Filed: Aug. 10, 1987

[51] Int. Cl.$^4$ .............................................. F16N 7/14
[52] U.S. Cl. ................................... 137/183; 137/590; 137/565
[58] Field of Search ............... 137/590, 113, 177, 183, 137/565; 55/159; 210/416.4, 416.5

[56] References Cited

U.S. PATENT DOCUMENTS

| | | | |
|---|---|---|---|
| 2,436,147 | 2/1948 | Le Clair | 137/113 X |
| 4,489,745 | 12/1984 | Netter | 137/590 X |
| 4,666,594 | 5/1987 | Schneider | 210/416.5 X |

OTHER PUBLICATIONS

Ward's Engine Update, 12/1/86; p. 3, "Walbro's Fuel Pump".

*Primary Examiner*—Alan Cohan
*Attorney, Agent, or Firm*—Donald F. Scherer

[57] ABSTRACT

A scavenger system (10) for a hydraulic recirculating installation, such as may be employed with a vehicular transmission (11), which employs a sump (18) to collect the recirculating hydraulic fluid (19). The sump (18) is to be maintained essentially dry, and as a result the requisite volume of hydraulic fluid (19) for the recirculating installation is stored within an independent reservoir (28). The sump (18) is provided with one or more collecitng wells (21), and a unique pickup head assembly (22) is received within each well (21). The pickup head assembly incorporates capillary ducts (46) which control communication between the well (21) and the conduit means (29) in response to the hydraulic fluid (19) within the well. The capillary filter serves to admit the flow of hydraulic fluid freely therethrough but precludes the passage of air therethrough. A circulating pump (25) has an inlet port (30) which communicates with the reservoir (28) by virtue of a conduit means (29). The conduit means (29) also effects communication between the inlet port (30) of the pump (25) and each pickup head assembly (22).

1 Claim, 2 Drawing Sheets

CAPILLARY VALVE FOR HYDRAULIC SYSTEMS

TECHNICAL FIELD

The present invention relates to recirculating hydraulic installations. In general, the present invention relates to recirculating hydraulic installations wherein a sump is provided to collect the hydraulic fluid and a reservoir is provided to store the hydraulic fluid in order that the sump may be maintained in an essentially dry condition. More particularly, the present invention relates to a fluid scavenging system wherein the sump is preferably provided with one or more collecting depressions, or wells, within which the hydraulic fluid can pool and from which the fluid can be scavenged through one or more pickup head assemblies, the pickup head assemblies incorporating a novel arrangement which precludes the entrainment of air in the fluid passing therethrough. Specifically, the present invention relates to the use of a pickup head assembly that employs a novel capillary filter which permits the flow of hydraulic fluid therethrough but which precludes the admission of air. By thus scavenging the fluid and returning it to a storage reservoir other than the sump, the sump will be maintained essentially dry.

BACKGROUND OF THE INVENTION

Recirculating hydraulic installations are particularly adapted to the lubrication of automotive engines and transmissions. Lubrication serves not only to reduce friction, and thus wear, between the moving parts but also to disperse heat, to reduce corrosion and, in an engine, to assist in the sealing action of the piston rings.

In most modern engines, or transmissions, the lubricating fluid is stored in the pan, or sump, that normally comprises the lowest part of the crankcase, or transmission housing. The fluid is fed by a pump to the moving parts to be lubricated, and the fluid returns, by gravity, to the sump. In addition to serving as the reservoir, the sump also serves as a cooler because it is normally located in, or in proximity to, the air stream beneath the vehicle.

It must be appreciated that moving parts can lose considerable energy by virtue of parasitic drag resulting from high speed contact between the moving parts and the lubricating fluid. In addition, the turbulence created by such contact results in considerable entrainment of air in the hydraulic fluid. Aeration of hydraulic fluids such as lubricating oils, and particularly in the high temperature environment of an engine, or the like, allows a build up of acids in the lubricating fluid. Those acids are, of course, quite deleterious to the parts which the fluid is intended to lubricate.

In an attempt to obviate such difficulties many high performance vehicles employ a "dry sump" system for the engine and/or transmission. Dry sump systems store the lubricating fluid in an independent tank, or reservoir, which may, incidentally, also function as a cooling radiator. Prior known dry sump systems deliver the lubricating fluid from the reservoir to the parts to be lubricated by a first pump, and as that fluid collects in the sump it is generally scavenged from the sump by a second pump that returns the fluid to the reservoir in order to maintain the sump essentially dry.

The heretofore known dual pump arrangements have been quite successful in maintaining the sump relatively dry, but in doing so such arrangements have, unfortunately, fostered the entrainment of a considerable amount of air within the lubricating fluid. The undesirable entrainment of air results from unsuccessfully attempting to balance the rate, or volume, of the flow out of the sump (occasioned by the action of one pump) with the rate, or volume, of the flow returning to the sump (occasioned by the action of the other pump in delivering the fluid for the purposes of lubrication). This inherent difficulty with dual pump arrangements has been further compounded by the fact that in a moving environment, such as in a vehicle, the sump cannot be maintained in any one attitude. Thus, the normal motion of the vehicle tends to move the fluid toward and away from the intake to that pump which serves to scavenge the sump, thereby effecting the undesirable intrusion of air into the system.

In some environments it may be possible to provide a sump having sufficient depth so that the intake to the recirculating pump will remain submerged within the fluid in the sump during the normal movement of the vehicle over the roadway. However, the clearance between the roadway and the sump, and particularly in high performance vehicles, is not always sufficient to permit the use of a sump having the configuration necessary to assure that the intake for the recirculating pump will remain submerged.

SUMMARY OF THE INVENTION

It is, therefore, a primary object of the present invention to provide a scavenging system for hydraulic fluid that will maintain the sump essentially dry and yet preclude the entrainment of air into the fluid.

It is another object of the present invention to provide a scavenging system, as above, that employs a unique arrangement which permits fluid to be scavenged from the sump only when the level of the fluid therein rises above a predetermined level and then only for so long as the fluid remains at, or above, that level.

It is a further object of the present invention to provide a scavenging system, as above, that will achieve the desired results without the use of a second pump.

It is yet another object of the present invention to provide a scavenging system, as above, that will be fully functional within the minimal clearance dimensions provided between the sump and the roadway of even high performance vehicles.

These and other objects of the invention, as well as the advantages thereof over existing and prior art forms, which will be apparent in view of the following detailed specification, are accomplished by means hereinafter described and claimed.

In general, a scavenging system embodying the concepts of the present invention employs an independent reservoir to store the requisite volume of fluid required for the hydraulic installation with which the scavenging system is to be used. A circulating pump delivers the hydraulic fluid from the reservoir to the location where it is to perform its function, and the fluid then collects, by gravity, within one or more sumps.

One or more depressions, or wells, are preferably located at the lowest level(s) of each sump. In order to maintain the sump(s) essentially dry, at least one pickup head assembly is located in each well. The inlet port of the circulating pump communicates not only with the reservoir but also with each pickup head assembly by virtue of a conduit means.

The pickup head assembly incorporates a novel capillary filter which controls communication between the well and the conduit means in response to the level of the hydraulic fluid within the well. By appropriately placing the pickup head assembly within each well one can maintain the sump(s) essentially dry.

An exemplary embodiment of a dry sump scavenging system embodying the concepts of the present invention is shown by way of example in the accompanying drawings and is described in detail in the following specification without attempting to show all of the various forms and modifications in which the invention might be embodied; the invention being measured by the appended claims and not by the details of the specification.

DESCRIPTION OF AN EXEMPLARY EMBODIMENT

An exemplary scavenging system embodying the concepts of the present invention is identified generally by the numeral 10 on the attached drawings. Although the scavenging system 10 is readily adaptable for inclusion in any recirculating system for hydraulic fluid wherein it is desired that the collecting pan, or sump, remain essentially dry, and wherein an independent fluid supply reservoir is to be employed, it will be appreciated that the scavenging system 10 is particularly suited for inclusion in conjunction with vehicular engines, transmissions, or other such mechanisms. Accordingly, and in order to facilitate an understanding of the invention, the disclosure of an exemplary embodiment of the scavenging system 10 shall be described in the operational environment of a vehicular installation such as a transmission that is designated generally by the numeral 11 on the attached drawings.

Figure 1:
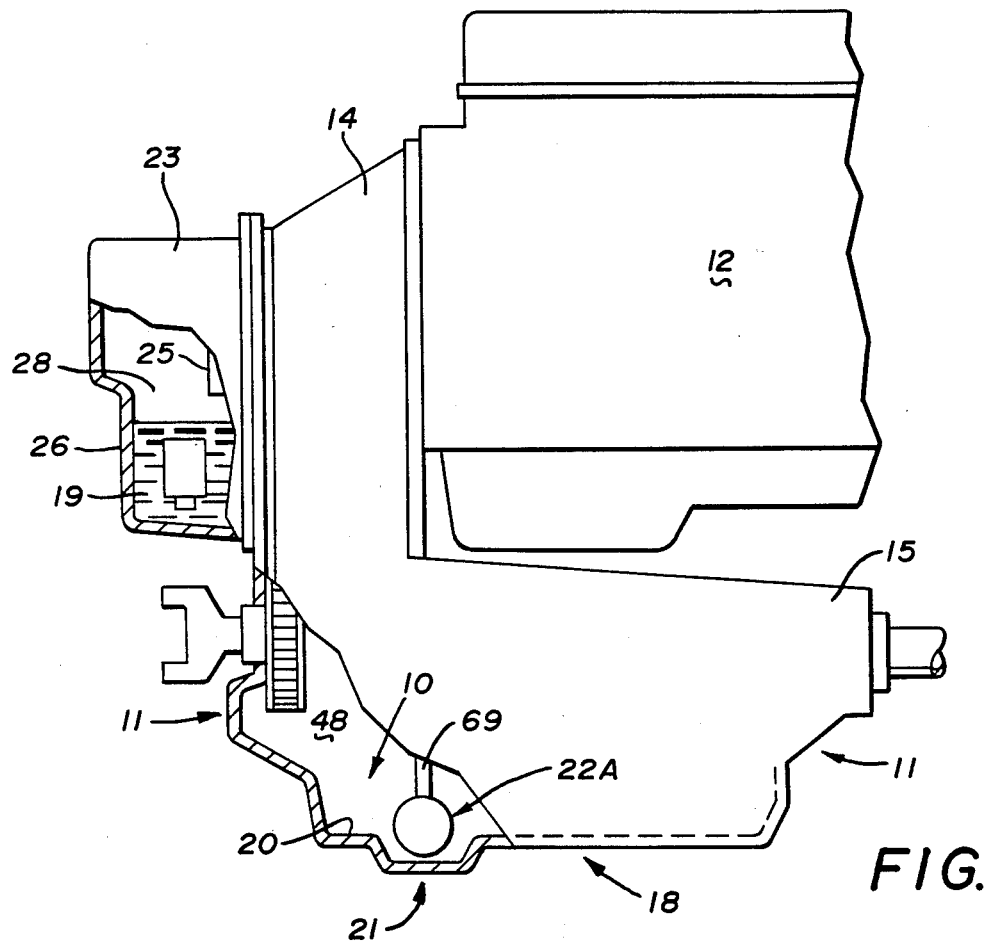
FIG. 1 is a side, elevational view, partly in section, of a representative operating environment, in this case a vehicular transmission, in which hydraulic fluid such as lubricating oil is required to be recirculated and to which environment a scavenging system embodying the concepts of the present invention is particularly adapted in order to maintain the fluid collecting sump at the lower extremity of the transmission housing essentially dry.

With particular reference, then, to FIG. 1 the transmission 11 is depicted in conjunction with a conventional engine 12. The transmission 11 has a housing 13 with an upper portion 14 that is secured to the engine 12 and encloses a torque converter, not shown. The lower portion 15 of the housing 13 encloses the transmission gearing, represented collectively and schematically in FIG. 3 by the numeral 16. A pan, or sump, 18 is provided beneath the lower portion 15 of the transmission housing 13 for collecting the hydraulic fluid 19, in this case the lubricating oil, as it flows, by gravity, from the transmission gearing 16.

It should be noted that in those installations wherein the sump 18 also serves as the fluid reservoir, the sump is, in most instances, demountably secured to the transmission housing 13. When employing a dry sump arrangement, however, one may form the sump 18 as an integral part of the housing 13.

In either event, the floor 20 of the sump 18 is preferably provided with one or more depressions, or wells, 21 which define the lowermost level(s) of the sump 18 to which the fluid 19 in the sump 18 would tend naturally to flow and within which the fluid will therefore localize, or pool, to be scavenged. As depicted, the well 21 may extend transversely across the floor 20 of the sump 18. One or more pickup head assemblies 22, hereinafter more fully described, are received within each such well 21.

In the description which follows, and particularly with respect to the pickup head assemblies, a common structural arrangement may be employed at more than one location. When referring generally to that type of structural arrangement a single numerical designation shall be employed. However, when one of the particular structural arrangements is to be individually referenced, it shall be designated by virtue of a letter suffix employed in combination with the numerical designation employed for general identification of that structural arrangement. Thus, there are two pickup head assemblies 22, and the individual pickup head assemblies are, therefore, identified as 22A and 22B on the drawings. This same suffix convention shall be employed throughout the specification.

Inasmuch as the well 21 extends transversely across the sump 18, one pickup head assembly 22A may be disposed at one lateral end of the well 21, and a second pickup head assembly 22B may be disposed at the opposed lateral end of the well 21. The details of the unique pickup head assemblies 22 will be hereinafter more fully described.

The transmission 11 also has an end cover 23 which may be secured to the upper portion 14 of the transmission housing 13 and may enclose a typical, gear type, circulating pump 25. With the pump 25 so located, the lower portion 26 of the end cover 23 may incorporate a storage reservoir 28 for the hydraulic fluid 19. Conduit means, identified generally by the numeral 29 and hereinafter more fully described, effect the desired communication between the inlet port 30 of the circulating pump 25 and the fluid storage reservoir 28 as well as between each of the pickup head assemblies 22 and the inlet port 30 of pump 25.

Figure 4:
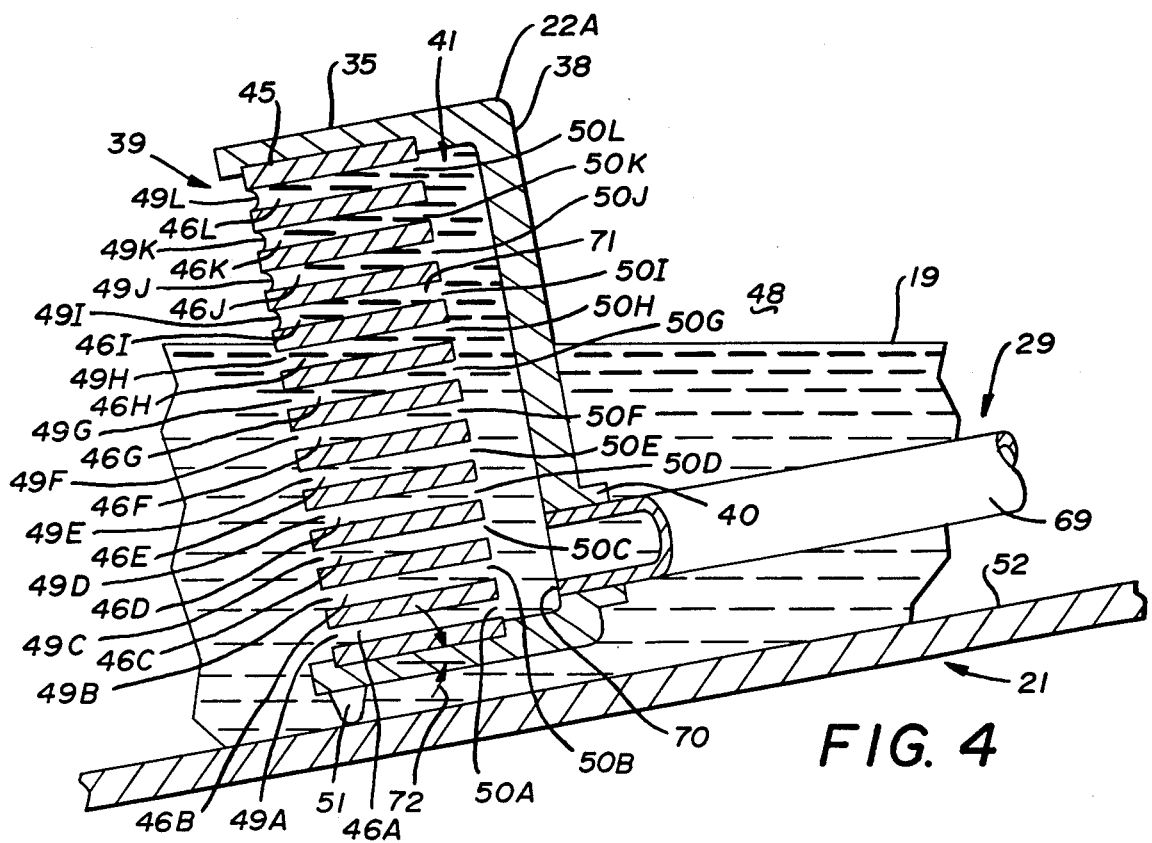

With particular reference to FIG. 4, the body portion of each pickup head assembly 22 is formed as a shroud 35 with one end capped, as at 38, and with the other end 39 open. A coupler 40 penetrates the capped end 38 in proximity to the lowermost portion of the shroud 35 in order to facilitate the extraction of as much fluid as possible from the well 21, into the admission chamber 41, encased within the interior of the shroud 35 and through the conduit means 29.

A flow filter 45 is fitted within the open end 39 of the shroud 35, and a plurality of capillary ducts 46 extend axially of the flow filter 45 to provide a means for effecting a selective access between the admission chamber 41 interiorly of the shroud 36 and the supply chamber 48 which constitutes the interior of the sump 18, and thus the interior of the well 21. Each duct 46 has an inlet end 49 which opens into the supply chamber 48, and each duct 46 also has an exhaust end 50 which opens into the admission chamber 41.

The selective access achieved by the ducts 46 allows the hydraulic fluid 19 to pass therethrough but precludes the passage of air therethrough. This selectivity results from the beneficial application of the surface tension of the fluid 19 and the capillary attraction resulting from the surface tension as the fluid interfaces with the ducts 46, a more detailed explanation for which is hereinafter set forth.

The shroud 35 of each pickup head assembly 22 may present a foot 51 by which the pickup head assembly 22 can rest on the floor 52 of the well 21—which floor is, in effect, the subfloor of sump 18—in order to maintain even the lowermost portion of the open end 39 of the shroud 35 modestly upwardly from any sludge that might accumulate on the floor 52 of the well 21.

Figure 2:
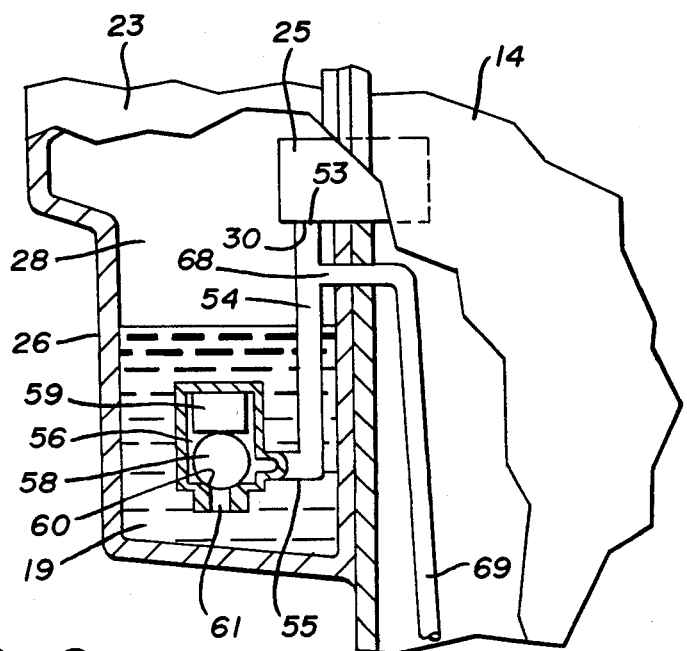
FIG. 2 is an enlarged area of FIG. 1.
Figure 3:
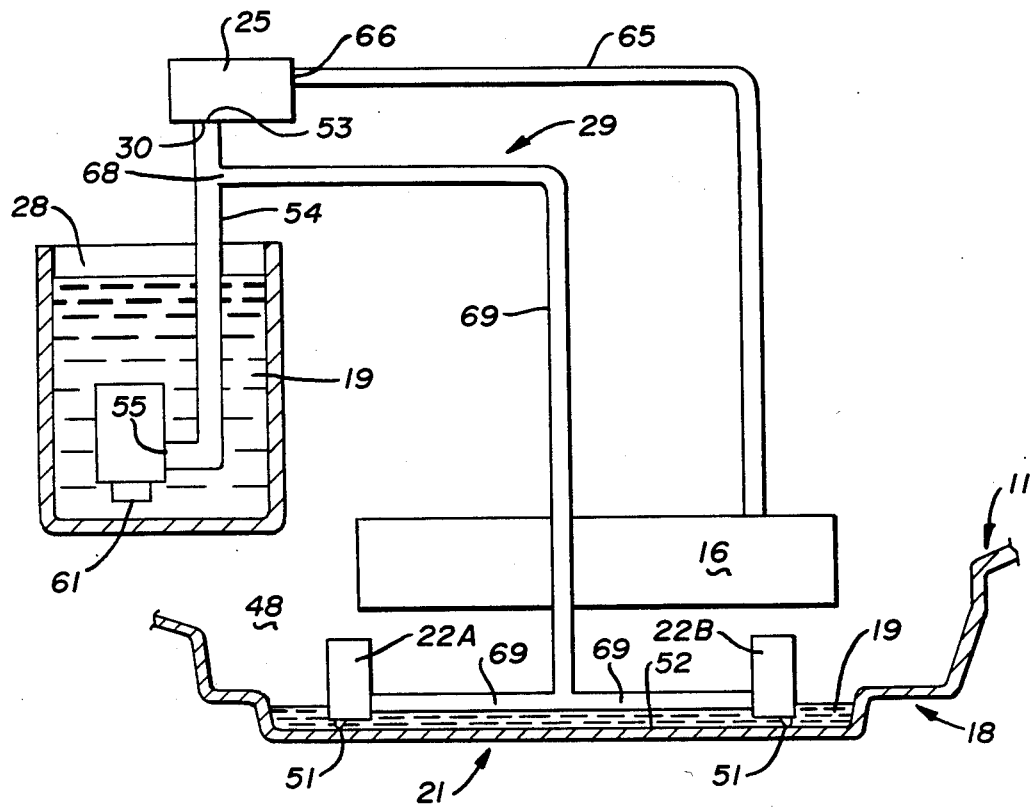
FIG. 3 is a schematic, elevational view of the operating environment depicted in FIGS. 1 and 2 in which a scavenging system embodying the concepts of the present invention is incorporated; and, FIG. 4 is a cross sectional view of a pickup head assembly which is depicted as being positioned in a well, the pickup head assembly incorporating a novel capillary filter that serves to admit the hydraulic fluid to the scavenging system embodying the concepts of the present invention but to preclude the admission of air.

With primary reference now to FIG. 3, the inlet port 30 of the circulating pump 25 communicates with one end 53 of a first branch 54 of the conduit means 29. The other end 55 of branch 54 is located within the lower extremity of the reservoir 28 and serves as the vertically displaced intake port for the pump 25. As is, however, best seen from FIG. 2, the end 55 opens through a valve chamber 56 wherein a check ball 58, biased by a weight 59, normally engages a seat 60 which circumscribes the port 61 in end 55 of branch 54.

A gallery, or other distribution header, 65 communicates with the outlet, or discharge, port 66 of the pump 25 and delivers the fluid 19 to preselected locations within the transmission gearing 16, as is well known to the art.

One end 68 of a second branch 69 of the conduit means 29 communicates directly with the first branch 54, and the second end 70 of branch 69 attaches to the coupler 40 of the pickup head assembly 22.

In order to accommodate the varying attitudes of the sump 18 a plurality of wells 21 may be employed. They may be located longitudinally, laterally and/or obliquely, one with respect to the other. Irrespective of whether one or more pickup head assemblies 22 are required, each responds to the level of the hydraulic fluid 19 in the particular well 21 within which that pickup head assembly 22 is positioned in order to effect a scavenging of the fluid 19 from that well and thereby maintain the sump 18 essentially dry.

In order to understand the operation of the ducts 46 in the flow filter 45 one must appreciate surface tension and the related physical phenomenon of capillary attraction. By way of a background explanation for the operation of the flow filter 45, it should be recalled that matter is held together by molecular forces. At a surface of discontinuity, such as between the free surface of a liquid and air, those forces produce conspicuous results. The physical chemistry of such interfacial surfaces is quite complex, and entire textbooks are devoted to this phenomenon. However, to expand upon the affect of those forces in a liquid to the extent necessary to explain the operation of the present invention, molecules deep within a liquid tend to repel each other because of their proximity, one to another. To the contrary, the absence of liquid molecules above the free surface of the liquid causes the liquid molecules at the surface to be attracted to each other, and thus behave in a manner suggesting the existence of a membrane stretched across the surface of the liquid. This membrane simulating mechanical effect of the molecules at the surface of the liquid constitutes surface tension.

In fact, the surface of the liquid is in tension in that it tends to contract and occupy as small an area as possible. On that basis surface tension is the force required to maintain a unit length of the free surface presented by the liquid in equilibrium, and such forces are quantitative. For example, the surface tension of water is approximately 0.005 pounds per foot (0.073 Newtons per meter) at 68 degrees F., and the surface tension of lubricating oil is approximately 0.0025 pounds per foot (0.063 Newtons per meter). The surface tension of a liquid—i.e., the property whereby the surface of a liquid tends to contract and occupy as small an area as possible—as well as the molecular forces of cohesion and adhesion, result in capillary attraction.

The attractive force between like molecules is designated as cohesion. The attractive force between unlike molecules is designated as adhesion. If the liquid wets the solid surface of the container in which the liquid is confined, the liquid has greater adhesion than cohesion. When a liquid thus wets the wall of a container, the liquid tends to expand along the wetted surface, and the free surface of the liquid assumes a concave configuration, thus making the contact angle which forms between the surface of the liquid and the container in which the liquid is received (measured within the liquid) less than 90 degrees.

On the other hand, if the liquid does not wet the solid surface, the liquid has greater cohesion than adhesion, and the free surface of the liquid will assume a convex configuration, thus making the contact angle (also measured within the liquid) greater than 90 degrees. Because the cross section of both a concave and a convex surface appears as a crescent, the free surface configuration of the liquid is designated as the meniscus.

Capillary attraction, as customarily visualized, is the behavior of a liquid when it comes in contact with one end of a duct, or tube, having a relatively small interior diameter. The adhesion between the liquid and the interior surface of the duct attracts the molecules toward the interior surface of the duct, and at the same time the cohesion within the liquid tends to oppose this attraction by pulling the liquid molecules more closely together. Lubricating fluid exhibits greater adhesion between the liquid and the interior of the duct than cohesion within the liquid. As noted above, lubricating fluid will, therefore, adhere to the interior wall of the duct, forming a concave meniscus.

The surface tension will cause the concave surface of the lubricating liquid to contract, thereby tending to flatten the concave, free surface of the liquid, thus pulling the liquid beneath the surface upwardly within the duct. In fact, in the normal demonstration of capillary attraction the interaction of the adhesion and the cohesion will cause the liquid to rise within a vertically upwardly oriented duct until the weight of the column of liquid within the duct is equal to the upward force resulting from the surface tension.

Capillary attraction can be quantified inasmuch as the lifting force is directly proportional to the product of the coefficient of surface tension multiplied by the cosine of the contact angle between the liquid and the interior of the duct 46 and is inversely proportional to the radius of the duct 46.

The relationship of the hydraulic fluid 19 to the duct 46 in the operation of the flow filter 45 relies on capillary attraction, but it is not the customary situation wherein the capillary attraction is opposed by the weight of the fluid within the column. Rather, the weight of the fluid within the column acts in concert with the capillary attraction to oppose the pressure differential applied by the pump 25 in order to retain a slug 71 of the fluid 19 within any duct 46, the inlet end 49 of which is exposed to air within the supply chamber 48, and thereby preclude the passage of air through such ducts 46.

Operation

In order to establish the requisite operational condition for the flow filter 45, and thus the pickup head assembly 22, it is necessary that the admission chamber 41, and therefore each duct 49, be charged with fluid 19. This "precondition" can be initially established by operating the pump 25 for a sufficient period of time to allow fluid to flow in conduit 69. Then, when the pump 25 is turned off, the fluid 19 in conduit 69 will flow back into, and fill, the admission chamber 41.

Thereafter, the admission chamber 41 remains properly charged with fluid 19, and a slug 71 of fluid 19 is retained in each duct 49, for the reasons that will be more fully apparent form the following explanation as to the operation of a pickup head assembly 22 embodying the concepts of the present invention.

In the exemplary environment with respect to which the pickup head assembly 22 is disclosed, the pump 25 delivers hydraulic fluid 19 through the conduit 65 to the gearing 16 within the transmission 11. From the gearing 16 the fluid 19 flows, by gravity, into the sump 18 where it pools within the well(s) 21. When the level of the liquid 19 is above the level of the inlet end 49A of duct 46A, or any other duct opening into the supply chamber 48, there is no surface of discontinuity between the fluid 19 within the supply chamber 48 and the fluid 19 within the duct 46.

Accordingly, when the pump is operating, the pressure differential between the admission chamber 41 and the supply chamber 48 forces the fluid 19 to flow from the supply chamber 48 through the duct 46A and into the admission chamber 41. From the supply chamber 48 the fluid 19 will flow through the conduit 60 connected to the coupler 40 and back to the pump 25 for recirculation.

In the situation where an insufficient volume of fluid 19 is returned from the well 21 to the pump 25, the pressure reduction at the intake port 30 of the pump 25 allows the ambient pressure acting on the surface of the fluid 19 within the reservoir 28 to lift the check ball 58 against the biasing action of the weight 59, and permit the fluid 19 within the reservoir 28 to satisfy the intake demand of the pump 25.

As an increasing volume of fluid pools within the well(s) 21 the level of the fluid within the well(s) rises to cover more and more inlet ends 49A–49H (FIG. 4) of the ducts 46 which open into the supply chamber 48, a correspondingly increased volume of the fluid is scavenged from the well(s) 21 through the pump 25. As more and more inlet ends 49 of the ducts 46 are exposed to the fluid 19 within the supply chamber 48, the pressure at the intake port 30 of pump 25 increases and the weight 49 will bias the ball 58 toward the seat 60 to control the flow through port 61 such that the primary source of fluid being recirculated by the pump 25 will be that which collects in the sump 18. Nevertheless, any additional fluid that is required to satisfy the demand of the pump 25 will come from the reservoir 28.

As the level of the fluid within the well(s) 21 falls below, for example, the inlet ends 49I through 49L of the ducts 46I through 46L opening into the supply chamber 48, the capillary attraction function serves to retain a slug 71 of fluid 19 within each duct 46I through 46L. The slug 71 of fluid 19 blocks the duct in which it is received and thereby serves to preclude the passage of air from supply chamber 48 through that duct 46 and into the admission chamber 41.

Analyzing the summation of forces acting upon the slug 71 within each duct 46 the differential force applied by the action of the pump 25, which applies a force differential across the flow filter 45 tends to move the liquid within the duct 46 into the admission chamber 41, but when a meniscus forms on the end of the slug 71 facing the supply chamber 48 the ring of surface tension of the liquid within that duct opposes movement of slug 71 into the admission chamber 41.

As previously explained, the force is directly proportional to the product of the coefficient of surface tension of the liquid multiplied by the cosine of the contact angle and inversely proportional to the radius of the duct 46. Because the lubricating fluid 19 wets the surface of the duct 46 so thoroughly, the contact angle approaches zero degrees. As such, the cosine of the contact angle approaches unity and can be ignored for at least preliminary calculations.

In addition, the weight of the volume of the slug 71 within the duct 46 also serves to oppose the pressure differential applied by the action of the pump 25. If the duct 46 were vertically oriented, the full weight of the slug 71 would oppose the pressure differential. However, when the duct is inclined, as at the angle of inclination 72 depicted, the effective weight of the slug 71 is the actual weight thereof multiplied by the tangent of the angle of inclination 72.

For a duct 46 having a diameter of approximately 0.0003 inches (0.0076 mm) the force of the capillary attraction will resist approximately a two pound per square inch (13.8 Kilopascal) force differential.

As should now be apparent, the use of a flow filter in the novel pickup head assembly embodying the concepts of the present invention will respond instantly to the level of the fluid 19 within the well 21 to readily admit the flow of liquid therethrough and yet preclude the entrainment of air into the fluid 19.

As such, it must be appreciated that a system 10 embodying the concepts of the present invention fully achieves the objects of the invention.

The embodiments of the invention in which an exclusive property or privilege is claimed are defined as follows:

1. A scavenging system for hydraulic recirculating installations comprising: a sump which collects circulating hydraulic fluid and which is to be maintained essentially dry, said sump defining a supply chamber and having a floor that delineates the lowest level of said sump; at least one collecting well in the floor of said sump; at least one pickup head assembly disposed within said well; each said pickup head assembly having a shroud with one open end, one capped end and a flow filter therebetween; a coupler penetrating said capped end of the shroud to define an admission chamber interiorly of said shroud; a plurality of capillary ducts extending through said flow filter, each capillary duct having and inlet end and an exhaust end; the inlet end of each capillary duct communicating with said supply chamber; the exhaust end of each capillary duct communicating with said admission chamber; a reservoir for storing hydraulic fluid; a pump for circulating hydraulic fluid, said pump having an inlet port; and, conduit means for communication among the inlet port of said circulating pump, said reservoir and the coupler penetrating each said pickup head assembly.

* * * * *